Jan. 1, 1957 H. O. ANGER 2,776,377
IN VIVO RADIATION SCANNER
Filed April 22, 1954 2 Sheets-Sheet 1

INVENTOR.
HAL O. ANGER
BY
Roland A. Anderson
ATTORNEY.

INVENTOR.
HAL O. ANGER
BY
ATTORNEY.

| United States Patent Office | 2,776,377
| --- | --- |
| | Patented Jan. 1, 1957 |

2,776,377

IN VIVO RADIATION SCANNER

Hal O. Anger, Berkeley, Calif., assignor to the United States of America as represented by the United States Atomic Energy Commission Application April 22, 1954, Serial No. 425,060

6 Claims. (Cl. 250—71)

This invention relates to scanning devices for locating gamma-emitting isotopes in the body of an animal, more especially a human patient.

Scanners employing a single scintillation counter have been used to scan the thyroid gland of human patients in vivo. In order to form an accurate idea of the distribution of the radioactive material throughout the patient, it has been necessary to measure counting rates at various positions over the body; a map drawn from this data would then outline the affected area.

Another scheme utilizing the single scintillation counter principle is employed in the gamma-ray pin-hole camera wherein a large flat scintillation phosphor in contact with a photographic plate produces an image on the latter. The low sensitivity of such pin-hole camera arrangement is a serious drawback and for routine of an extensive area of the body both of the foregoing expedients are tedious and require a great deal of time. It was to significantly shorten the time involved, eliminate mapping of individual areas and lessen the chances of error due to the variation in skill of the operator that the present invention was evolved.

Accordingly, it is a principal object of the invention to provide a highly efficient apparatus for routine scanning of a human patient from head to toe.

Another object of the invention is to provide an apparatus capable of routine scanning of a patient in approximately one-tenth the time previously necessary.

A further object of the invention is to provide an apparatus which is particularly useful in locating thyroid carcinoma metastases and residual thyroid tissue in humans.

An additional object of the invention is to provide a scanning apparatus which produces a picture of increased definition by interlacing the individual scans.

Figures 1, 2:
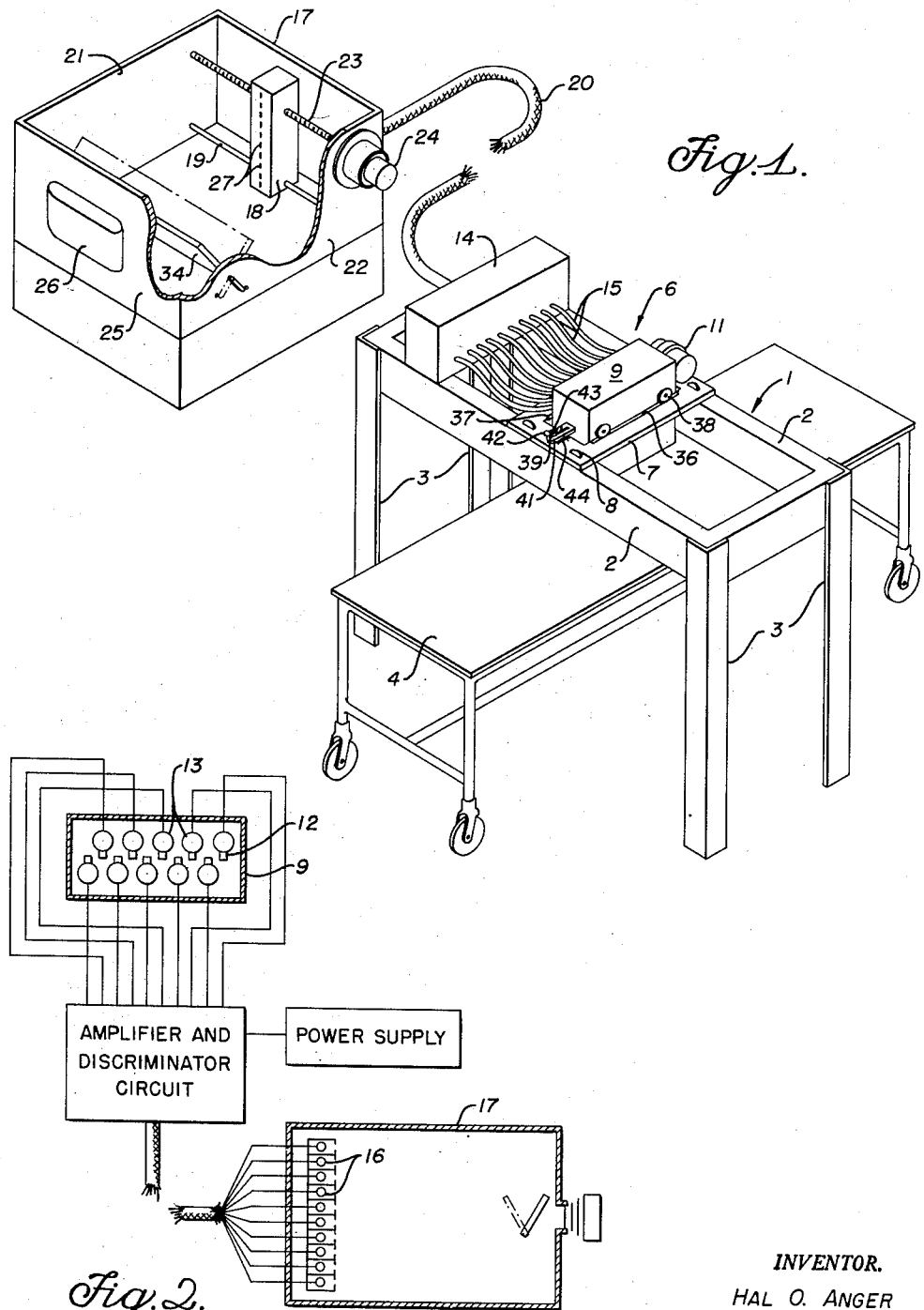
Figure 3:
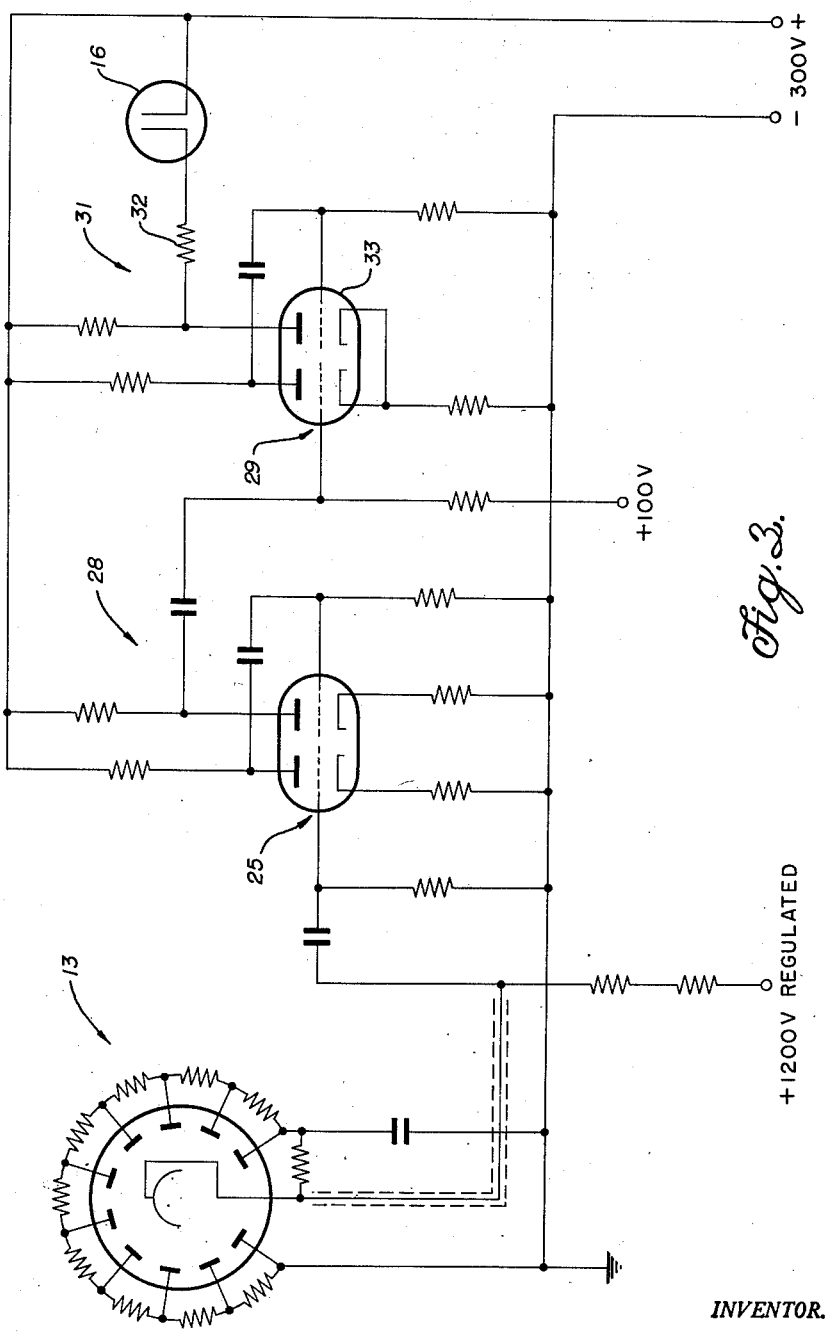

Other objects and advantages will be obvious and will be apparent from the annexed specification and drawings wherein like reference characters refer to like parts throughout the several figures and wherein Figure 1 is a perspective view with some portions cut away of the principal components of my improved scanning apparatus as arranged for use;

Figure 2 is a schematic diagram showing the principal electrical components of my apparatus and their interconnection; and Figure 3 is a circuit diagram of one channel of the multi-channel amplifier and discriminator circuit preferably employed in the invention.

In general, it is to be noted that instead of a single scintillation counter I provide an array of counters arranged in alignment longitudinally of the recumbent patient. The first scan is made by moving the array transversely of the patient for about 24 inches and then back to the starting point. To cover the entire patient a number of longitudinally spaced scans are made, each scan producing a separate picture through the use of specially designed, remotely located photographic recording equipment and the correct juxtaposition of the individual pictures producing a complete and composite head-to-toe picture.

Reference is now made to Fig. 1 of the drawings wherein a rectangular frame 1 having side rails 2 is maintained at a suitable horizontal elevation by means of vertical legs 3 and above a mobile table 4 adapted to support a patient.

A carrier 6 for the scintillation counter array may conveniently have the form of a rectangular plate 7 in which are journaled suitable rollers 8 at the corners thereof and resting on rails 2 while a box-like lead housing 9 for such array is symmetrically mounted in a rectangular aperture in plate 7 and occupies the major central area thereof. A synchronous motor 11 mounted on plate 7 is adapted to move the latter along rails 2 through a suitable drive arrangement such as a rack mounted on the adjacent rail and a pinion carried by motor 11; such arrangement being conventional it has been omitted from the drawing.

Bearing in mind the pin-hole camera principle earlier mentioned, it appears desirable to next describe the scintillation counter array which is mounted in housing 9 and constitutes a significant and highly efficient arrangement. Referring, therefore, to Figs. 1 and 2, it will be seen that each counter unit consisting of a phosphor 12 and adjacent phototube 13 is in one of a pair of parallel, staggered rows with the phosphors lying along a line dividing lead housing 9 longitudinally and the associated phototubes lying on either side of said line and defining said rows. A ⅜ inch diameter aperture (not shown) is provided in the lower, horizontal or bottom wall of lead housing 9 directly beneath each phosphor 12. Since it is preferred to employ ten phosphor phototube units, said apertures are spaced $1\tfrac{1}{16}$ inch apart so that they cover an area upon traverse of carrier 6 which is approximately 7 inches long and 24 inches wide, the latter being the preferred traverse amplitude.

Mounted upon rails 2 at the far end of frame 1, so as to be beyond any patient area to be scanned by the scintillation counter array, is a ten channel amplifier-discriminator 14, the input of each unit of which is connected as by a lead 15 to a respective phototube 13 and the output of which is connected as by cable means 20 to a respective argon glow lamp 16 as shown in Figs. 2 and 3 and more specifically described hereinafter. Lamps 16 are ten in number and are disposed in vertical alignment in a light-tight box 17 (Figs. 1 and 2). More specifically, glow lamps 16 are mounted in a suitable carrier 18 supported by a guide rod 19 passing therethrough and suitably anchored in opposite sides 21, 22 of box 17. Worm shaft 23 suitably journaled in sides 21, 22 and threaded through carrier 18 above rod 19 is rotated by synchronous motor 24 mounted on side 22 thereby traversing carrier 18. Centrally mounted in the side wall 25 of box 17 opposite from carrier 18 is a camera 26 with its lens in alignment with a suitable wall aperture and facing rectangular apertures 27 aligned with the respective glow lamps 16. Thus, it will be seen that as carrier 6 is moved along rails 2 in scanning movement by energization of synchronous motor 11, the similarly energized motor 24 will move the carrier 18 correspondingly along shaft 23 and rod 19. Concurrently, as the phosphors 12 traverse areas of the patient in which radioactive material is present, the corresponding phototubes 13 will be activated producing pulses at the inputs of the corresponding amplifier-discriminator units which energize the respective glow lamps 16 in carrier 18. The camera film will therefore record across its surface a pattern of individual light exposures as short vertical lines depicting the radioactivity of the patient area scanned in the traverse of the carrier 6. Lines have been found to produce better apparent definition than dots in the finished negative.

Various refinements are incorporated in the preferred form of the invention briefly described in the foregoing in order to produce photographic films of maximum diagnostic value. For example, in the ten channel amplifier-discriminator 14, of the preferred circuit, one channel of which is shown in Fig. 3 pulses are received from phototubes 13 at the input 25 of a dual triode amplifier 28. The output of the latter is connected to the input 29 of a one-shot multivibrator circuit 31. Plate load resistor 32 of the second triode unit 33 of the multivibrator circuit 31 is connected to glow lamp 16. Triode unit 33 remains in a nonconducting state until a pulse of sufficient magnitude is impressed on the input 29 of multivibrator circuit 31 causing said unit to become conductive, an action which continues for approximately 1/50 second and produces a flash in the corresponding glow lamp 16. Triode unit 33 continues nonconducting until triggered by the next large pulse. The discrimination against weak pulses such as those due to phototube noise is important in preventing vagarant flashing of lamp 16, although no inherent novelty is asserted in the amplifier-discriminator circuit per se.

Preferred counter units employ a type 1P21 photomultiplier tube and a thallium activated sodium iodide phosphor, the latter being in the form of an unpolished crystal 3/8" square by 11/16" long and contained in a holder filled with suitable material such as Monsanto Aroclor to exclude moisture from the crystal. The holder is so disposed as to hold the phosphor adjacent the photocathode of the photomultiplier tube.

Instead of producing a picture by traversing carrier 6 from right to left and then the reverse for each negative over the same path, increased definition results from providing means whereby housing 9 and its enclosed counters may be shifted laterally, i. e., along the line defined by phosphors 12, for a distance equal to one-half the spacing of adjacent phosphors and again moving the carrier 6 back and forth along rails 2 as previously. In this way the ten rows of dots (lines) with ten line definition can be increased to twenty line definition by use of means for interlacing optically the flashes from glow lamps 16. Such means may be constituted as a relatively thick (one-half inch), rectangular plate 34 of suitable material (e. g., Lucite) disposed in front of the camera lens and movable through such a sufficient angle normal to the lens axis that the second series of dots interlaces or registers on the film in the spaces between those resulting from the original scan. By providing parallel slots or grooves 36, 37 in plate 7 normal to rails 2 for guiding means such as wheels or rollers 38 supporting housing 9 and end-slotting the plate 7 at 39, the housing may be moved to its interlace position 11/32 inch to the left of its original scanning position (Fig. 1). A combined index and stop in the form of a slotted finger 41 secured to housing 9 may be retained in position and with it the housing 9 by a thumb nut 42 threaded on to a bolt 43 fixed to plate 7. A suitable marker 44 together with finger indicates the reference position of housing 9.

As previously mentioned, a single scanning movement covers a subject area 7 inches wide by 24 inches long so that ten or eleven individual pictures are necessary to make a head-to-toe composite picture. Such operation can be performed in about 45 minutes allowing four minutes for each scan. With the Polaroid-Fairchild oscilloscope camera preferably employed, a finished print of each scan can be produced in one minute's time.

As described, the scanner of the present invention will detect one microcurie a $I^{131}$ when the activity is spread over a one inch diameter circle or less at a distance two inches from the apertures, with 3/8 inch diameter apertures at a scanning speed of 11 inches per minute and assuming two inches of tissue equivalent material between the scanner and the source. Greater sensitivity can be obtained with no loss in definition by scanning at a slower speed or by taking repeated scans of the same area, each scan being recorded on the same print.

By replacing the bottom of housing 9 with a plate having smaller apertures better definition with correspondingly lower sensitivity is obtained, 3/8 inch apertures being used for human subjects, 1/8 inch being employed for small animals assuming sufficient gamma-emitting activity.

It will be understood that other changes may be made in the form of the invention described, e. g., providing a guide track and linear index for the patient table 4 shown, to more accurately dispose the same for the sequential scans necessary or to even substitute a more elaborate carriage and track as is common in the field of X-ray photography. Accordingly, I do not desire that my invention shall be limited except as the same may fall within the scope of the following claims.

What is claimed is:

1. In an in-vivo radiation scanner, the combination comprising an array of directional radiation counters, said counters being disposed along a first axis, means for simultaneously translating said array in a direction normal to said axis, pulse amplification means connected to said counters for amplifying pulses therefrom, an array of glow lamps equal in number to said counters and disposed along a second axis, said glow lamps being so connected to said pulse amplification means as to produce a flash therein upon pulse generation by said counters, means in synchronism with said first-named means for translating said lamp array in a direction normal to said second axis, and light responsive recording means disposed in front of said lamp array for producing a radiation distribution pattern according to the energization of said counters.

2. The combination of elements set forth in claim 1 and wherein said recording means is a photographic camera.

3. The combination of elements set forth in claim 1 and wherein each of said translating means comprises a synchronous motor connected to the same power source for synchronous operation.

4. The combination of elements set forth in claim 1 and wherein said pulse amplification means also includes means for discriminating against weak pulses and background noise.

5. The combination of elements set forth in claim 1 and including means whereby said counter array may be moved laterally of its original direction of translation to provide a slightly displaced direction of translation scanning parallel to the first direction thereof.

6. The combination of elements set forth in claim 1 and including optical means disposed between said lamp array and said recording means and shiftable to two angularly displaced positions for interlacing the images produced by said glow lamps.

References Cited in the file of this patent

UNITED STATES PATENTS 2,621,560     Steinhardt _____ Dec. 16, 1952
2,653,247     Lundahl _____ Sept. 22, 1953

OTHER REFERENCES

Large-Volume Liquid Scintillators: Their Applications, by Harrison et al., from Nucleonics, vol. 12, No. 3, March 1954, pages 44–47.